3,244,543
METHOD FOR PREPARING HARDENED ASPHALT COMPOSITIONS

William E. Lifson, Short Hills, N.J., and John P. McDermott, San Diego, Calif., assignors to Esso Research and Engineering Company, a corporation of Delaware
No Drawing. Filed Nov. 20, 1962, Ser. No. 239,067
4 Claims. (Cl. 106—279)

The present invention concerns a new process for preparing hardened asphalts. More particularly, it relates to a new process whereby significant quantities of iron are introduced into asphalt yielding a new asphalt composition which generally will not soften up to its decomposition point, this decomposition point being at temperatures greatly in excess of those at which asphalts known to the art have softened.

The production of oxidized asphalts by blowing air through a petroleum residue or straight run asphalt at elevated temperatures is well known in the art of petroleum refining. It has been established that such a procedure has a decided effect upon the physical properties of the asphalt. In general, this technique serves to increase the hardness, softening point, pliability, and weathering resistance of an asphalt and decreases its ductility and susceptibility to changes in temperature. It will be noted that the hardness of a straight run asphalt may be greatly increased by extensive steam or vacuum distillation of the asphalt, but the resulting product in this instance is generally very temperature susceptible. The air-blowing technique, in comparison with the vacuum distillation method, is capable of producing an asphaltic product of greater pliability but of the same hardness as an asphaltic product produced by vacuum distillation of the same straight run asphalt. As a result of this very desirable hardness, pliability and weathering resistance qualities, oxidized asphalts have become very popular in the production of roofing asphalts, protective coatings, electrical insulating compositions, moulded articles, and the like. In general, oxidized asphalts are available having softening points of about 100° F. to 250° F. or more, and penetrations of about 200 down to about 10 (100 g./5 sec./77° F.). By comparison, straight reduced asphalts are generally available possessing softening points of about 100° F. to 170° F. and having penetration values of about 200 down to 10 or 20 (100 g./5 sec./77° F.).

In connection with the conventional process of air-blowing petroleum asphalts, it has further been found that certain materials may be added to the asphalt being processed which will further modify the physical properties of the final product. For example, U.S. 2,845,359 describes a heat treatment of asphalt in the presence of $P_2O_5$ which improves its penetration and ductility properties at a given softening value. Furthermore, it has been established that compounds such as ferric chloride make possible the production of air-blown asphalts having even greater softening points for a given penetration than is possible by air blowing alone. The use of these materials also greatly reduces the period of time usually required in an air-blowing operation. See for example U.S. 2,776,933.

In contrast to the above known processes, the present invention achieves the hardening of asphalt without resort to an air-blowing step. Furthermore, the process produces a hardened, rubber-like asphalt composition which contains substantial amounts of iron, e.g. 0.5% to 20%, preferably about 7.7%. However, the invention can also be used to harden asphalts which have been previously oxidized by conventional means. A substantial increase in the temperature stability of the asphalt so treated is noted. This new asphalt composition is distinguished from previous compositions not only by the fact that it contains substantial amounts of iron but also by the fact that it may possess no actual softening point but rather may decompose at temperatures in the vicinity of 400° F., thereby emphasizing that a new compound has been in fact formed.

The process involves treating cutback asphalt with about 5 to 200 wt. percent on asphalt of iron pentacarbonyl $$[Fe(CO)_5]$$

preferably with about 50–175 wt. percent $Fe(CO)_5$. The reaction is run for about 12 to 20 hours in a relatively high boiling organic solvent in which both asphalt and iron pentacarbonyl are soluble. Suitable solvents include toluene, benzene, chloroform, carbon disulfide, etc. A preferred solvent is toluene. Furthermore, the process is run under an oxygen-free inert gas atmosphere. Gases suitable for this purpose include nitrogen, helium, argon, carbon dioxide, and the like. Nitrogen is a preferable gas due to its ready availability and low cost.

Because of their rubber-like physical characteristics, the new asphalt compositions derived from the above process are useful where a flexible asphalt coating or film is desired such as in roofing, asphalt mulches, corrosion preventive coatings, insulating compositions, molding compositions and the like.

The nature of this invention will be more fully understood from the following examples.

Example 1

A mixture totaling 100 ml. (92.7 g.) of 220° softening point oxidized asphalt-toluene (50% w./w.) and 73.0 g. of $Fe(CO)_5$ was treated at 100° C. for 16 hours under nitrogen in a 250 ml. flask equipped with a reflux condenser and thermometer. After cooling, the solution was diluted with 500 ml. of toluene and poured into a Rotarex Separator to remove a small amount of insoluble material. The unit was rinsed with toluene until the effluent was clear.

The total toluene solution was poured into an evaporating dish and left on the steam bath overnight. The residue, a black, rubbery solid possessing a strong toluene odor, was dissolved in 1.5 liters of toluene and the resulting solution was stripped in an abson distillation assembly, under a stream of nitrogen to remove all of the toluene. A total of 50.1 g. of a rubbery solid was obtained which had no softening point but which started to decompose at about 400° F. upon heating. By comparison, the original untreated asphalt had a softening point of 200°–230° F.

Example 2

A 4-necked one-liter flask equipped with a thermometer, nitrogen inlet tube, reflux condenser and dropping funnel was charged with a solution of 206 g. of Flux A, a type of asphalt having a penetration greater than 200 and therefore usually semi-solid or liquid, in 206 g. of toluene. A slow stream of nitrogen was passed through the equipment during the addition of $Fe(CO)_5$, and the subsequent heating and distillation.

A total of 103 g. of $Fe(CO)_5$ was then added dropwise to the stirred asphalt-toluene solution, after which the reaction mixture was heated under reflux for 15 hours (103°–106°).

Chloroform was added, while distilling the mixture, to remove unreacted $Fe(CO)_5$. This codistillation was continued until the overhead was clear ($Fe(Co)_5$ is an amber colored liquid).

The reaction solution was filtered to remove a small amount of insoluble material. The filtrate was placed on a steam bath to remove the solvent whereupon 215.5 g. of a rubbery, lumpy, black solid was obtained. The products had a softening point of 338° F. By contrast, the original untreated asphalt was too fluid to obtain a softening point.

Analyses on the products derived from Examples 1 and 2 are presented in the following table:

EFFECT OF IRON CARBONYL TREATMENT OF ASPHALT

|  | Flux A | | 220° S. P. Oxid. Asphalt | |
|---|---|---|---|---|
|  | Original | Treated | Original | Treated |
| Percent Iron | 0.0008 | 2.35 | 0.0013 | 7.7 |
| Softening Point, °F | (¹) | 338 | 220-230 | (²) |
| Penetration at 77° F | (¹) | 13 | 18 | 7 |
| Solubility in CS$_2$, gms | 99.9 | 97.8 | 99.6 | 88.97 |
| Insolubility in Naphtha (86) | 16.4 | 44.2 | 39.6 | 53.3 |

¹ Asphalt was too fluid to obtain softening point and penetration; Furol viscosity at 210° F. was 499-500 secs. and at 250° F. was 144-146 secs.
² Decomposed at 400° F. without softening.

The products derived from the present process are soluble in aromatic and halogenated solvents. Such solutions may be conveniently used to deposit layers of the product where flexible, rubber-like coatings are desired.

This invention has been described in connection with certain specific embodiments thereof. However, these are merely for purposes of illustration and applicants do not intend to be limited thereby.

What is claimed is:

1. An improved method for hardening asphalt comprising treating asphalt with 5 to 200 weight percent on asphalt of iron pentacarbonyl at a temperature of about 100° C. in a suitable, relatively high boiling organic solvent selected from the class consisting of toluene, benzene, chloroform and carbon disulfide and under an inert, oxygen-free atmosphere.

2. The method of claim 1 wherein 50 to 175 weight percent on asphalt of iron pentacarbonyl is added.

3. The method of claim 1 wherein the solvent is toluene.

4. An improved method for hardening asphalt comprising treating asphalt with 50 to 100 weight percent on asphalt of iron pentacarbonyl in a toluene solution at about 100° C. and under a nitrogen atmosphere.

References Cited by the Examiner

UNITED STATES PATENTS

| 1,782,186 | 11/1930 | Abson | 208—5 |
| 2,044,014 | 6/1936 | Penniman | 196—142 |
| 2,342,861 | 2/1944 | Hemmer | 106—279 |
| 2,370,007 | 2/1945 | Carr | 208—5 |
| 2,421,421 | 6/1947 | Hoiberg | 208—5 |
| 2,774,724 | 12/1956 | Watson | 196—142 |
| 2,775,530 | 12/1956 | Gagle et al. | 106—280 |

ALEXANDER H. BRODMERKEL, *Primary Examiner.*

MORRIS LIEBMAN, *Examiner.*

JOAN B. EVANS, *Assistant Examiner.*